(12) United States Patent
Lee

(10) Patent No.: US 8,064,508 B1
(45) Date of Patent: Nov. 22, 2011

(54) EQUALIZER WITH CONTROLLABLY WEIGHTED PARALLEL HIGH PASS AND LOW PASS FILTERS AND RECEIVER INCLUDING SUCH AN EQUALIZER

(75) Inventor: Dongyun Lee, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 2043 days.

(21) Appl. No.: 10/247,675

(22) Filed: Sep. 19, 2002

(51) Int. Cl.
*H03H 7/30* (2006.01)

(52) U.S. Cl. ............ 375/229; 375/230; 327/52; 327/65; 327/557; 327/558; 327/559; 327/560

(58) Field of Classification Search .................. 375/229, 375/230; 330/252; 327/52, 65, 557, 558, 327/559, 560
See application file for complete search history.

(56) References Cited

U.S. PATENT DOCUMENTS

| | | | | |
|---|---|---|---|---|
| 4,079,334 A | * | 3/1978 | Hamilton | 330/279 |
| 4,363,007 A | * | 12/1982 | Haramoto et al. | 333/14 |
| 4,982,435 A | * | 1/1991 | Kato et al. | 381/102 |
| 5,371,803 A | * | 12/1994 | Williamson, III | 381/104 |
| 5,708,391 A | * | 1/1998 | Altmann et al. | 330/252 |
| 6,169,764 B1 | * | 1/2001 | Babanezhad | 375/233 |
| 6,614,304 B2 | * | 9/2003 | Shoji et al. | 330/254 |
| 6,819,166 B1 | * | 11/2004 | Choi et al. | 327/551 |
| 7,167,517 B2 | * | 1/2007 | Farjad-Rad et al. | 375/232 |
| 2003/0072227 A1 | * | 4/2003 | Yamashita et al. | 369/44.36 |

OTHER PUBLICATIONS

Shakiba, M. H., "*A 2.5Gb/s Adaptive Cable Equalizer*," ISSCC99/Session 23/Paper WP 23.3, *1999 IEEE International Solid-State Circuits Conference*, Feb. 17, 1999, pp. 396, 397 & 483.

* cited by examiner

*Primary Examiner* — Chieh M Fan
*Assistant Examiner* — Leila Malek
(74) *Attorney, Agent, or Firm* — Girard & Equitz LLP

(57) ABSTRACT

An adjustable equalizer that includes a first branch including a low pass filter (LPF) and having a variable gain ($\beta$), and a second branch including a high pass filter (HPF) and having another variable gain ($\alpha$). Outputs of the branches in response to an input signal are summed to produce an equalized output. The equalizer can be implemented using CMOS technology so that the gain parameters $\beta$ and $\alpha$ are independently adjustable and the equalizer is capable of equalizing an input indicative of data having a maximum data rate of at least 1 Gb/s. Typically, the inventive equalizer is embodied in a receiver for use in equalizing a signal, indicative of video or other data, that has propagated over a serial link to the receiver.

18 Claims, 4 Drawing Sheets

EQUALIZER WITH CONTROLLABLY WEIGHTED PARALLEL HIGH PASS AND LOW PASS FILTERS AND RECEIVER INCLUDING SUCH AN EQUALIZER

TECHNICAL FIELD OF THE INVENTION

The invention pertains to circuitry for equalizing signals (e.g., high frequency signals indicative of data having data rate greater than 1 Gb/s) that have been received after propagating over a link. Typically, the inventive equalization filter is implemented using CMOS technology and is included in a receiver coupled to a serial link to receive a signal indicative of data transmitted at a high data rate (e.g., above 1 Gb/s), to perform equalization needed for reliable data recovery.

BACKGROUND OF THE INVENTION

The transmission of signals indicative of data (e.g., signals indicative of video or audio data) to a receiver over a link degrades the data, for example by introducing time delay error (sometimes referred to as jitter) to the data. In effect, the link applies a filter (sometimes referred to as a "cable filter") to the signals during propagation over the link. The cable filter can cause inter-symbol interference (ISI).

Equalization is the application of an inverted version of a cable filter to signals received after propagation over a link. The function of an equalization filter (sometimes referred to as an "equalizer") in a receiver is to compensate for, and preferably cancel, the cable filter. Equalization at the receiver side of a link is typically needed in order to achieve reliable data recovery when the data rate is high (greater than or equal to 1 Gb/s).

A typical conventional equalizer used in a receiver employs both an adjustable high pass filter (HPF) and an adjustable low pass filter (LPF). The HPF and LPF can be adjusted to vary pole and zero locations and gain parameters thereof, in order to minimize signal degradation in the equalized signal (i.e., to achieve the best data "eye"), and the equalized signal can then be sampled to recover the transmitted data.

When a receiver including such a conventional equalizer is implemented using CMOS technology, adjustment of the equalizer is impractical when the data rate exceeds 1 Gb/s (1 Gigabit per second) because the transconductance (gm) for the CMOS transistor circuitry is relatively small and any additional switch or passive element in the equalizer would have a large adverse effect on equalizer performance. Thus most conventional equalizers are implemented using Bipolar or Bipolar/CMOS (BiCMOS) technology which is more costly than CMOS technology. See for example, the paper by M. H. Shakiba, entitled "A 2.5 Gb/s Adaptive Cable Equalizer," 1999 IEEE International Solid-State Circuits Conference, Paper WP 23.3, pages 396-397 and 4483.

Several proposals have been made for implementing equalizers using CMOS technology, such as those described in U.S. Pat. No. 6,169,764, issued Jan. 2, 2001, to Babanezhad. U.S. Pat. No. 6,169,764 suggests implementing an equalizer as a high pass filter using "transconductance-capacitor (or gm-C) techniques," or as a high-pass, continuous time (RMC) filter comprising differentiators that are made up of a variable resistor along with an operational amplifier and its differentiating capacitor. However, the high-pass, continuous time filters described in U.S. Pat. No. 6,169,764 are limited to applications in which the data rate does not exceed several hundred Megabits per second due to inherent limitations in both the CMOS technology and the circuit concept employed therein.

SUMMARY OF THE INVENTION

In a class of embodiments, the invention is a controllable equalizer comprising a first branch including a low pass filter (LPF) and having a first variable gain (sometimes referred to as gain "$\beta$"), and a second branch including a high pass filter (HPF) and having a second variable gain (sometimes referred to as gain "$\alpha$"). The outputs of the two branches in response to an input signal are summed to produce an equalized output. The equalizer can be implemented using CMOS technology so that the gain parameters $\beta$ and $\alpha$ are independently controllable and the equalizer is capable of equalizing an input signal indicative of data having a maximum data rate of at least 1 Gb/s. Preferably, the equalizer's transfer function has a zero whose location can be controlled by varying one of the gain parameters ($\beta$ and $\alpha$) relative to the other of the gain parameters. Preferably also, the transfer function has a peak-to-DC gain difference that can be controlled by varying one of the gain parameters relative to the other of said gain parameters. Typically, the inventive equalizer is embodied in a receiver for use in equalizing a signal that is indicative of video data (or other data) having a maximum data rate of at least 1 Gb/s, and has propagated over a serial link to the receiver.

In preferred embodiments, the equalizer is implemented with current sharing between its branches. For example, in a class of preferred embodiments implemented using CMOS technology, the HPF includes a first differential pair of MOS transistors and the LPF includes a second differential pair of MOS transistors. Current flows from one node into both differential pairs, with a first transistor of the first differential pair sharing the current with a first transistor of the second differential pair. Current also flows from another node into both differential pairs, with a second transistor of the first differential pair sharing the current with a second transistor of the second differential pair.

In preferred embodiments useful for equalizing a differential input signal, the equalizer includes two differential pairs of MOS transistors. A first current source determines the tail current for one differential pair, a second current source determines the tail current for the other differential pair, and the current sources are independently controllable. Preferably, the transistors are NMOS transistors (but they can be PMOS transistors in alternative embodiments). Preferably, impedance elements (each having impedance Z1) are coupled between the drains of the NMOS transistors and a top rail maintained at source potential during operation. A first differential pair includes impedance elements (each having impedance Z0) and behaves as a LPF whose gain is Z1/Z0. A second differential pair includes impedance elements (each including an element having impedance Z0 in parallel with a capacitor having capacitance C, or the equivalent) and has the transfer function Z1/Z0·(1+s·C·Z0), where s=j$\omega$, and $\omega$=(frequency)/2$\pi$. If both Z0 and Z1 are purely resistive, the overall transfer function of the equalizer is Z1/Z0·($\beta$+$\alpha$·(1+s·C0·Z0)), where $\beta$ is a gain parameter determined by the first differential pair's controllable tail current and $\alpha$ is a gain parameter determined by the second differential pair's controllable tail current.

In a class of embodiments, the invention is a receiver configured to equalize a signal, indicative of video data (or other data) having a maximum data rate of at least 1 Gb/s, that has propagated over a serial link to the receiver. For example, the receiver can include equalizers that filter incoming signals on multiple channels of the link (e.g., the incoming signals on channels CH0, CH1, and CH2 of a TMDS link) in accordance with the invention to compensate for the degradation that each signal suffers during propagation (e.g., over a long cable) from a transmitter to the receiver.

DETAILED DESCRIPTION OF THE PREFERRED EMBODIMENTS

Figure 1:
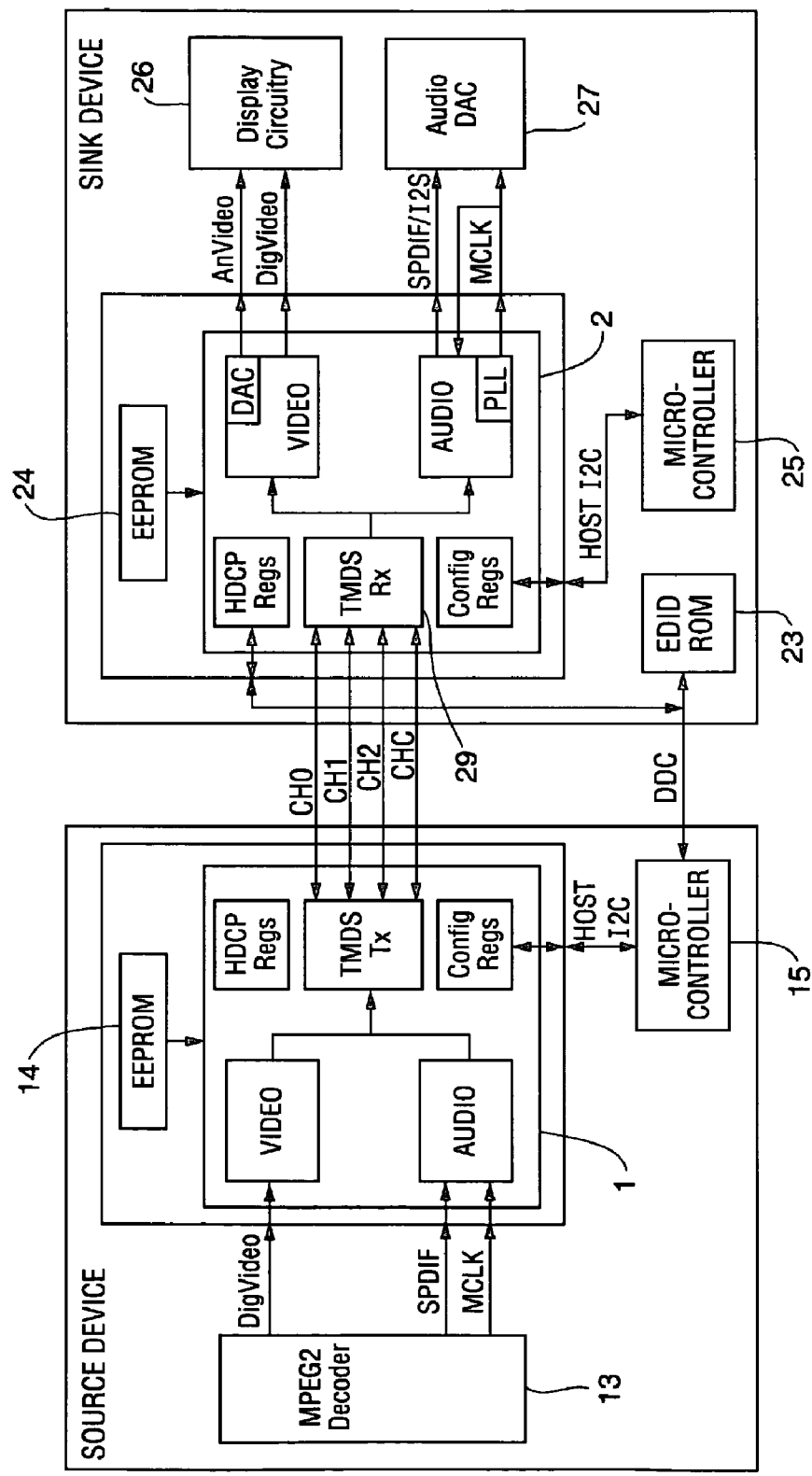
FIG. 1 is a block diagram of a system that can embody the invention.

The term "transmitter" is used herein in a broad sense to denote any device capable of encoding data and transmitting the encoded data over a link (and optionally also performing additional functions, which can include encrypting the data to be transmitted and other operations related to encoding, transmission, or encryption of the data). The term "receiver" is used herein in a broad sense to denote any device capable of receiving and decoding data that has been transmitted over a link (and optionally also performing additional functions, which can include decrypting the received data and other operations related to decoding, reception, or decryption of the received data). For example, the term transmitter can denote a transceiver that performs the functions of a receiver as well as the functions of a transmitter.

In typical embodiments, the invention is a receiver configured to be coupled to a serial link having at least one video channel. The receiver includes equalizer circuitry for equalizing at least one signal received over at least one channel of the link in accordance with the invention, before extraction of data (e.g., video data) or a clock from each equalized signal.

One conventional serial link, used primarily for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);

2. the encoded video data and a video clock signal are transmitted as differential signals (the video clock and encoded video data are transmitted as differential signals over conductor pairs);

3. three conductor pairs are employed to transmit the encoded video, and a fourth conductor pair is employed to transmit the video clock signal (sometimes referred to herein as a pixel clock); and 4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. A DVI link can be implemented to include two TMDS links (which share a common conductor pair for transmitting a video clock signal) or one TMDS link, as well as additional control lines between the transmitter and receiver. A class of embodiments of the invention can be implemented in a system of a type shown in FIG. 1. The FIG. 1 system includes a source device including transmitter 1, MPEG2 decoder 13, and microcontroller 15, coupled as shown. The system also includes a sink device including receiver 2, EDID ROM 23, microcontroller 25, display circuitry 26, and audio digital-to-analog converter 27, coupled as shown, and a TMDS link between transmitter 1 (and microcontroller 15) and receiver 2 (and EDID ROM 23).

The TMDS link includes channels CH0, CH1, and CH2 (each implemented as a conductor pair) for transmitting encoded video and audio data, channel CHC (also implemented as a conductor pair) for transmitting a pixel clock for the video data, Display Data Channel ("DDC") lines for bidirectional communication between the source and a monitor associated with the sink in accordance with the conventional Display Data Channel standard (the Video Electronics Standard Association's "Display Data Channel Standard," Version 2, Rev. 0, dated Apr. 9, 1996), a Hot Plug Detect line (not shown) on which the monitor transmits a signal that enables a processor associated with the source to identify the monitor's presence, analog lines (not shown) for transmitting analog video from the source to the sink, and power lines (not shown) for providing DC power to the sink and a monitor associated with the sink. Receiver 2 is configured to extract a clock for the audio data from signals transmitted over at least one channel of the TMDS link (e.g., an audio clock determined by the pixel clock and time stamp data transmitted over one or more of data transmission channels CH0, CH1, and CH2).

Decoder 13 asserts input video ("DigVideo") to a video data processing subsystem of transmitter 1 and asserts input audio data ("SPDIF") and an audio reference clock ("MCLK") to an audio data processing subsystem of transmitter 1. Input audio SPDIF can be indicative of two or more streams of audio data (e.g., left and right stereo signals). EEPROM 14 stores key values and identification bits for use in encryption of content to be transmitted to receiver 2. In typical implementations, the encryption is in accordance with the conventional cryptographic protocol known as the "High-bandwidth Digital Content Protection" ("HDCP") protocol.

In the sink device, EDID ROM 23 is coupled to the TMDS link's DDC channel and stores status and configuration bits which can be read by microcontroller 15 over the DDC channel. Receiver 2 also includes an interface (not shown) for communication via the DDC channel with microcontroller 15. Microcontroller 25 is coupled for I2C communication with receiver 2.

Receiver 2 includes core processor 29 which recovers data and a pixel clock from the signals received on channels CH0, CH1, CH2, and CHC, de-serializes the recovered data, decodes the de-serialized 10-bit TMDS code words to generate 8-bit data words, identifies which of the 8-bit words are indicative of audio data and which are indicative of video data, routes the audio data to a pipelined audio subsystem of receiver 2, and routes the video data to a pipelined video subsystem of receiver 2. The audio data are decrypted and further processed in the audio subsystem, and the video data are decrypted and further processed in the video subsystem.

EEPROM 24 of the sink device stores key values and identification bits for use in decryption of content received from transmitter 1. Typically, the decryption is accomplished in accordance with the HDCP protocol. Display circuitry 26 receives the analog and/or digital video output by receiver 2. Audio digital-to-analog converter 27 receives the digital audio output by receiver 2.

The FIG. 1 system is typically configured to operate in response to a pixel clock having frequency in the range from 25 MHz to 165 MHz, and transmitter 1 is configured to transmit such a pixel clock over channel CHC. As will be explained below, if receiver 2 implements an embodiment of the inventive equalization circuitry, the FIG. 1 system can operate in response to a pixel clock having frequency greater than 1 GHz (e.g., when the video data transmitted over the link are in HDTV format).

During typical operation of the FIG. 1 system, transmitter 1 transmits video data to receiver 2 over Channels CH0, CH1, and CH2 during active video periods, transmits audio data (e.g., left and right stereo signals) over one or more of Channels CH0, CH1, and CH2 to receiver 2 at times other than during the active video periods, continuously transmits a pixel clock (e.g., determined by the rising edges of a binary waveform) over Channel CHC, and transmits time stamp data (over one or more of Channels CH0, CH1, and CH2) with each burst of the audio data. The time stamp data, together with the pixel clock, determine a clock for the audio data. Core processor 29 in receiver 2 is configured to process the time stamp data with the pixel clock to regenerate the audio clock employed to transmit the audio data.

Figure 2:
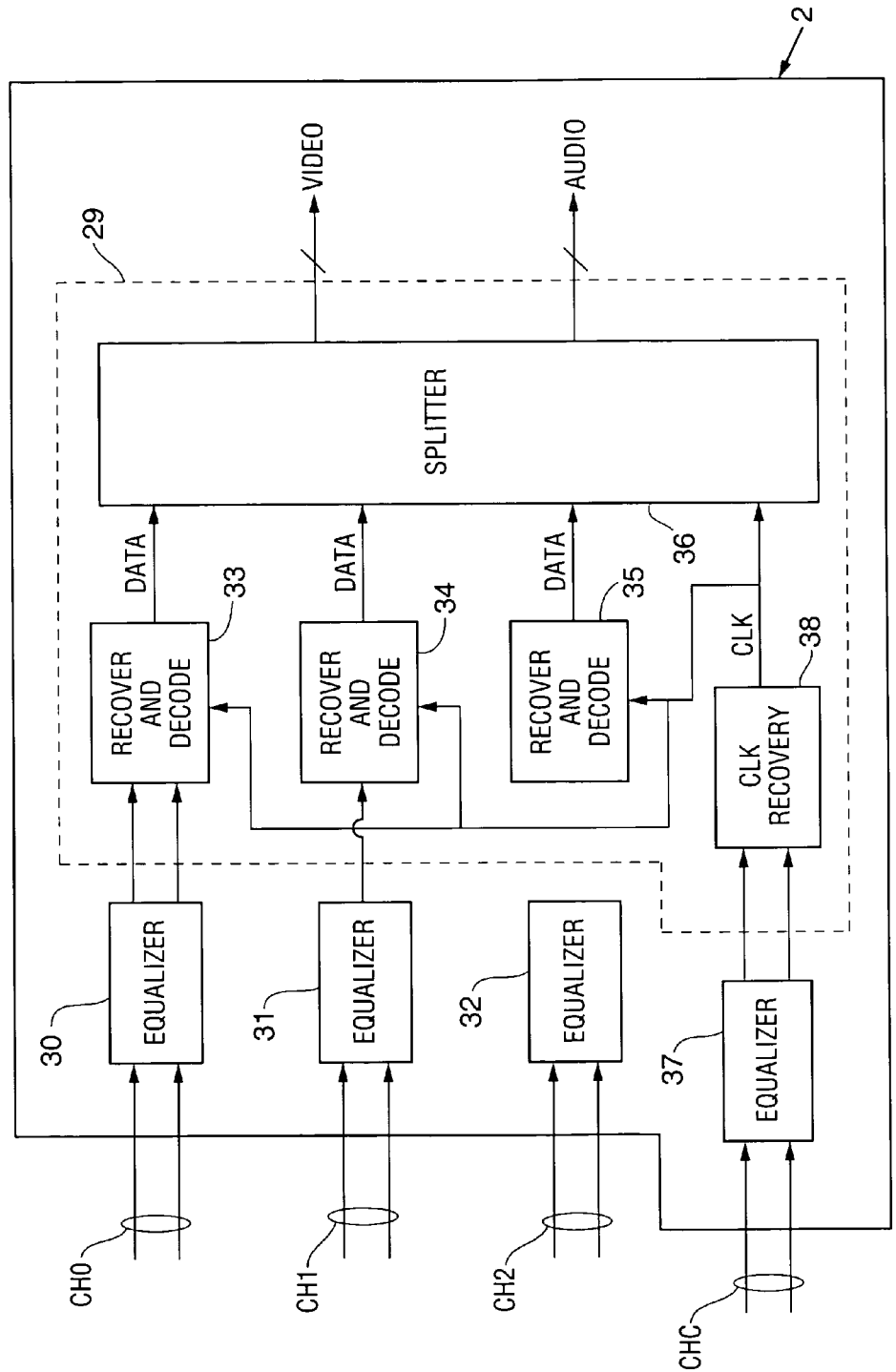
FIG. 2 is a block diagram of some elements of an implementation of receiver 2 of FIG. 1 that embodies the invention.

Receiver 2 of FIG. 1 can be configured in accordance with the invention to include equalizer circuitry (circuits 30, 31, 32, and 37 of FIG. 2) for equalizing signals received over channels CH0, CH1, and CH2 of the TMDS link of FIG. 1 in accordance with the invention. Optionally, receiver 2 also includes equalizer circuitry for equalizing signals received over other channels of the link in accordance with the invention. As shown in FIG. 2, receiver 2 includes equalizer circuits 30, 31, and 32 which respectively assert equalized signals to data recovery and decoding subsystems 33, 34, and 35 of core processor 29. As shown, receiver 2 also includes equalizer circuit 37 which asserts an equalized signal to clock recovery subsystem 38. The video data determined by the signals transmitted over channels CH0, CH1, and CH2 are typically in RGB format, and the red, green, and blue pixels are determined by the signals transmitted on channels CH2, CH1, and CH0, respectively. Receiver 2 of FIG. 2 is preferably implemented as integrated circuit, or portion of an integrated circuit, using CMOS technology.

Equalizer 30 is coupled to receive a differential signal (indicative of blue pixels and typically also audio data) that has been transmitted over the two conductors of channel CH0, and configured to perform equalization on this signal and assert the resulting equalized signal (a differential signal) to subsystem 33 of core processor 29. Equalizer 31 is coupled to receive a differential signal (indicative of green pixels and typically also audio data) that has been transmitted over the two conductors of channel CH1, and configured to perform equalization on this signal and assert the resulting equalized signal (a differential signal) to subsystem 34 of core processor 29. Equalizer 32 is coupled to receive a differential signal (indicative of red pixels and typically also audio data) that has been transmitted over the two conductors of channel CH2, and configured to perform equalization on this signal and assert the resulting equalized signal (a differential signal) to subsystem 35 of core processor 29.

Equalizer 37 is coupled to receive a differential signal (indicative of a pixel clock) that has been transmitted over the two conductors of channel CHC, and is configured to perform equalization on this signal and to assert the resulting equalized signal (a differential signal) to clock recovery subsystem 38 of core processor 29. Clock recovery subsystem 38 recovers the pixel clock from the equalized signal. In variations on the FIG. 2 receiver, equalizer 37 is omitted, and clock recovery subsystem 38 receives a differential signal (indicative of a pixel clock) that has been transmitted over channel CHC and recovers the pixel clock from this non-equalized signal.

Each of subsystems 33, 34, and 35 asserts to splitting subsystem 36 of core processor 29 a stream of 8-bit words, at least some of which are indicative of video data and typically including some indicative of audio data. Subsystem 36 distinguishes the video data from the audio data, routes the audio data to a pipelined audio subsystem, and routes the video data to a pipelined video subsystem for decryption and further processing.

Figure 3:
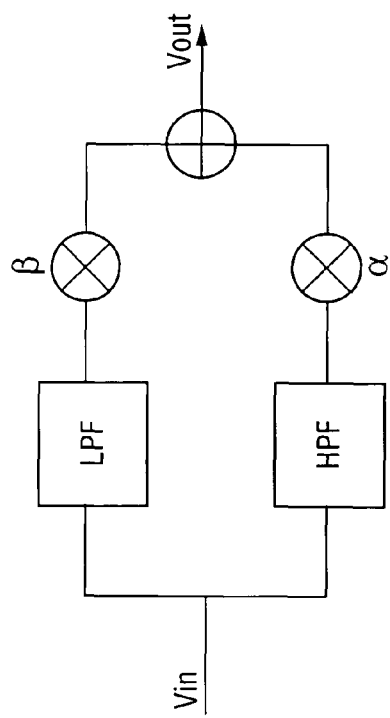
FIG. 3 is a block diagram of an embodiment of the inventive equalization circuit.

The inventive equalizer (e.g., each of equalizers 30, 31, 32, and 37 of FIG. 2) is implemented to perform the functions of the filter shown in FIG. 3. The FIG. 3 filter includes a first branch including a low pass filter (LPF) and a variable gain element (whose gain is $\beta$), and a second branch including a high pass filter (HPF) and a variable gain element (whose gain is $\alpha$). The outputs of the two branches are summed to produce an equalized output (Vout) in response to an input (Vin).

The transfer function of the FIG. 3 filter has a zero whose location can be controlled by varying the gain parameters $\beta$ and $\alpha$. The FIG. 3 filter can be implemented using CMOS technology such that the location of its transfer function's zero (and preferably also the transfer function's peak-to-DC gain difference) can be controlled by varying one of the gain parameters $\beta$ and a relative to the other of said gain parameters, and such that the CMOS-implementation of the filter is useful to equalize an input signal having at least one frequency component of frequency equal to or greater than 1 GHz.

Figure 7:
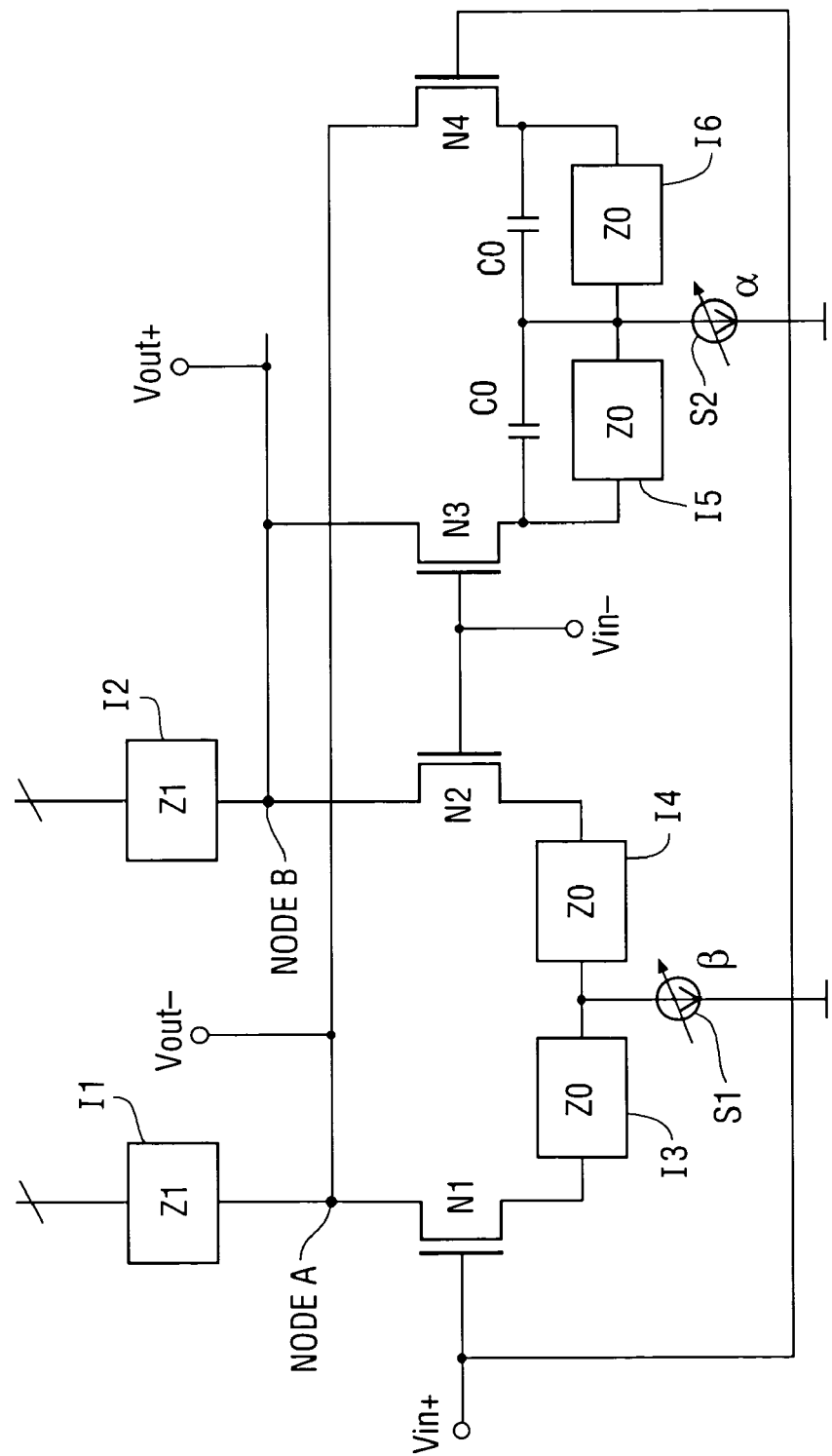
FIG. 7 is a block diagram of a preferred implementation of the equalization circuit of FIG. 3.

Preferably, the FIG. 3 filter is implemented with current sharing between the HPF and LPF branches, as is the FIG. 7 embodiment described below. The FIG. 7 filter is an example of a class of equalization filters having the FIG. 3 design that are implemented using CMOS technology and in which the HPF includes a first differential pair of MOS transistors (NMOS transistors N1 and N2) and the LPF includes a second differential pair of MOS transistors (NMOS transistors N3 and N4). In FIG. 7, current flows from one node (node A) into both differential pairs, with a first transistor of the first differential pair sharing the current with a first transistor of the second differential pair. Current also flows from another node (node B) of FIG. 7 into both differential pairs, with a second transistor of the first differential pair (another transistor of the HPF) sharing the current with a second transistor of the second differential pair (another transistor of the LPF).

In general, the gain of the inventive equalization filter and the location of a zero of its transfer function are controlled in accordance with the invention in a manner that allows the filter to be implemented with CMOS technology and to be useful to equalize an input signal having at least one frequency component of frequency equal to or greater than 1 GHz (e.g., in applications in which the input signal is indicative of data having a maximum data rate of at least 1 Gb/s).

Figure 6:
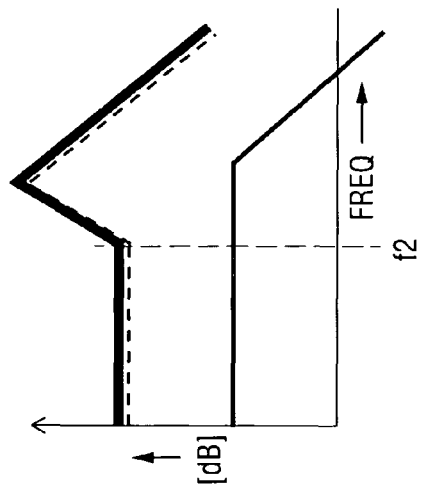
FIG. 6 is a graph in which the dashed curve, thin solid curve, and thick solid curve respectively represent gain applied to an input voltage by the HPF of FIG. 3 as a function of frequency of the input voltage, gain applied to the input voltage by the LPF of FIG. 3 as a function of input voltage frequency, and gain applied to the input voltage by the overall FIG. 3 filter as a function of input voltage frequency, for parameters $\beta$ and $\alpha$ that satisfy $\alpha \gg \beta$.
Figure 5:
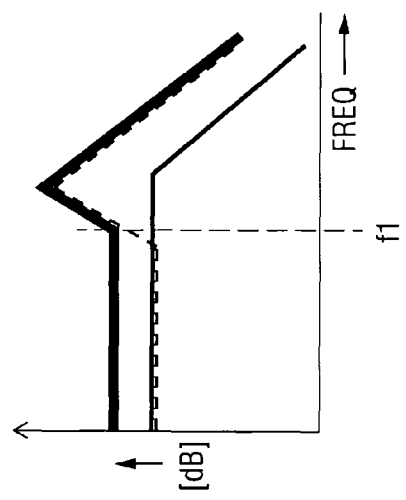
FIG. 5 is a graph in which the dashed, thin solid, and thick solid curves respectively represent gain applied to an input voltage by the HPF of FIG. 3 as a function of frequency of the input voltage, gain applied to the input voltage by the LPF of FIG. 3 as a function of input voltage frequency, and gain applied to the input voltage by the overall FIG. 3 filter as a function of input voltage frequency, in the case that parameter $\beta$ is at least substantially equal to parameter $\alpha$.
Figure 4:
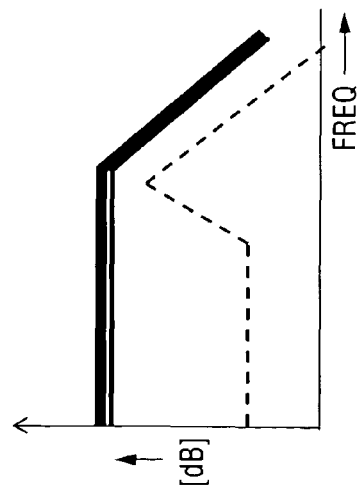
FIG. 4 is a graph in which the dashed curve, thin solid curve, and thick solid curve respectively represent gain applied to an input voltage by the HPF of FIG. 3 as a function of frequency of the input voltage, gain applied to the input voltage by the LPF of FIG. 3 as a function of input voltage frequency, and gain applied to the input voltage by the overall FIG. 3 filter as a function of input voltage frequency, for gain parameters $\beta$ and $\alpha$ that satisfy $\beta \gg \alpha$.

The effect of independent adjustment of the gain parameters β and α of FIG. 3 will be explained with reference to the graphs of FIGS. 4, 5, and 6. In FIGS. 4, 5, 6, the dashed curves represent the gain applied to an input voltage by a typical implementation of the HPF of FIG. 3 (as a function of frequency of the input voltage), the thin solid curves represent the gain applied to the input voltage by a typical implementation of the LPF of FIG. 3 as a function of frequency of the input voltage, and the thick solid curves represent the gain applied to the input voltage by the overall FIG. 3 filter (including such a LPF and such an HPF) as a function of frequency of the input voltage.

As shown in FIG. 4, when the gains β and α are set such that β>>α, the LPF (whose characteristic is represented by the thin solid curve in FIG. 4) has greater weight than the HPF (whose characteristic is represented by the dashed curve in FIG. 4), and the overall filter characteristic (represented by the thick curve in FIG. 4) closely follows that of the LPF.

As shown in FIG. 6, when the gains β and α are set such that α>>β, the LPF (whose characteristic is represented by the thin solid curve in FIG. 6) has less weight than the HPF (whose characteristic is represented by the dashed curve in FIG. 6), and the overall filter characteristic (represented by the thick curve in FIG. 6) closely follows that of the HPF, so that the filter's zero is located at a relatively low frequency (f2).

As shown in FIG. 5, when the gains β and α are set to be comparable, the overall filter characteristic (represented by the thick curve in FIG. 5) is such that the filter's zero is shifted to higher frequency (f1) than in FIG. 6. By controlling gain β relative to gain α, the location of the zero of the FIG. 3 filter can be controlled to have any of a range of values.

The expressions "high pass filter" and "HPF" are used herein (including in the claims) in a broad sense to denote a filter having a transfer function that is flat or substantially flat below a first frequency (where the first frequency is substantially greater than zero) and whose magnitude, at least some frequencies above the first frequency, is greater than at frequencies below the first frequency. Thus, one example of an HPF is a filter of this type having a pass band in a frequency range above the first frequency (i.e., its transfer function has magnitude in such range greater than its magnitude at frequencies below the first frequency) but which rolls off at frequencies above this range (e.g., a filter whose transfer function is as shown in the dashed curve of FIG. 4, 5, or 6). Another example of an HPF is a filter of this type whose transfer function has magnitude, in a frequency range above the first frequency, greater than its magnitude at frequencies below the first frequency, but which does not roll off significantly at higher frequencies (at least in the range in which the input signal has frequency components of significant amplitude).

Typically, the HPF of the inventive equalizer (shown in FIG. 3) rolls off at high frequencies (in the GHz range), as do the HPF implementations whose transfer functions are shown as the dashed curves in FIGS. 4, 5, and 6. This roll off is caused by circuit parasitic components and CMOS transistor limitations and cannot practically be avoided with current process technology. It is also within the scope of the invention to implement the HPF of FIG. 3 using CMOS technology in such a manner as to achieve either the same or different (and preferably less) roll off at high frequencies (greater than 1 GHz) than shown in FIGS. 4-6.

By increasing gain α relative to gain β, to move the location of the FIG. 3 filter's zero from the location (f1) shown in FIG. 5 to a lower frequency, the filter's peak-to-DC gain difference increases (so that there is more boosting at high frequencies). This tendency is consistent with the fact that a lower frequency pole in the cable filter (the filter that is compensated for by the equalization filter of FIG. 3) causes more severe ISI.

FIG. 7 is a block diagram of an exemplary implementation of the FIG. 3 filter. The FIG. 7 circuit assumes that the input voltage is a differential signal determined by the difference between first potential "Vin+" and second potential "Vin−," and generates an equalized output signal that is a differential signal determined by the difference between potential "Vout+" and potential "Vout−." In FIG. 7, two source regenerative NMOS differential pairs are coupled together: a first pair comprising NMOS transistors N1 and N2, impedance elements I3 and I4, and current source S1 (which determines the tail current), connected as shown; and a second pair comprising NMOS transistors N3 and N4, impedance elements I5 and I6, two capacitors C0, and current source S2 (which determines the tail current), connected as shown. The gates of transistors N1 and N4 are at input potential "Vin+" and the gates of transistors N2 and N3 are at input potential "Vin−." The drains of transistors N1 and N4 are at output potential "Vout−" and the drains of transistors N2 and N3 are at output potential "Vout+." The first differential pair of FIG. 7 corresponds to the first branch (including LPF) of the FIG. 3 circuit, and the second differential pair of FIG. 7 corresponds to the second branch (including HPF) of the FIG. 3 circuit, with impedance elements I1 and I2 (and the current through elements I1 and I2) shared by both branches.

Impedance element I1 (having impedance value Z1) is coupled between the drains of transistors N1 and N4 and a top rail maintained at source potential during operation, and impedance element I2 (also having impedance value Z1) is coupled between the drains of transistors N2 and N3 and the top rail. Each of elements I3, I4, I5, and I6 has the impedance value Z0. In preferred implementations, each of impedance elements I1, I2, I3, I4, I5, and I6 is purely resistive. In alternative implementations, one or more of the impedance elements can be both inductive and resistive, or purely inductive.

Current sources S1 and S2 are independently controllable. The FIG. 7 filter's gain parameter β (described above with reference to FIG. 3) can be varied by adjusting current source S1, thereby controlling the tail current of the first differential pair (the differential pair including transistors N1 and N2). The FIG. 7 filter's gain parameter α (described above with reference to FIG. 3) can be varied by adjusting current source S2, thereby controlling the tail current of the other differential pair (the differential pair including transistors N3 and N4).

The first differential pair (including transistors N1 and N2) behaves as a LPF whose gain is Z1/Z0.

The second differential pair (including transistors N3 and N4) includes an impedance element (having impedance Z0) in parallel with a capacitor (having capacitance C0) between the source of transistor N3 and current source S2, and an identical impedance element between the source of transistor N4 and current source S2. Thus, the second differential pair has the transfer function $Z1/Z0 \cdot (1+s \cdot C0 \cdot Z0)$, where $s=j\omega$, and $\omega=$(frequency)$/2\pi$. In variations on the FIG. 7 embodiment, the elements between the source of transistor N3 and current source S2 (and between the source of transistor N4 and current source S2) are replaced by other elements having the same impedance as does a capacitance C0 in parallel with an impedance Z0.

If both Z0 and Z1 are purely resistive, the second differential pair's transfer function has a zero at 1/(C0·Z0), and the transfer function of the equalizer of FIG. 7 is Z1/Z0·(β+α·(1+s·C0·Z0)) because two output currents steered by the differential pairs (the current through the channel of N1 and the current through the channel of N4) are drawn from node A, and two output currents steered by the differential pairs (the current through the channel of N2 and the current through the channel of N3) are drawn from node B. The current through the channel of N1 and the current through the channel of N2 (produced by a first branch of the equalizer), together with the current through the channel of N3 and the current through the channel of N4 (produced by a second branch of the equalizer) determine the equalized output signal (the difference between the potentials Vout+ and Vout−) produced by the equalizer.

In the FIG. 7 embodiment, the control parameters a and 13 can be controlled independently by independently adjusting current sources S1 and S2 to determine the tail current for each of the differential pairs. An advantage of the FIG. 7 design is that this adjustment does not require any variable resistor or capacitor, since variable resistors and variable capacitors are costly and difficult to control. Furthermore, the control path is totally isolated from high frequency signal path, resulting in no negative effect on equalizer performance.

Variations on the FIG. 7 embodiment are contemplated, including variations in which the impedance elements (including the capacitors) shown in FIG. 7 are replaced by different impedance elements.

If more equalization or bigger DC-to-peak gain difference is needed, one can employ a variation on the FIG. 7 embodiment in which one stage of the FIG. 7 filter is cascaded (e.g., cascaded many times).

The FIG. 7 filter can be implemented to be useful to perform equalization of a differential input signal indicative of data having a maximum data rate of at least 2 Gb/s when implemented by any of a variety of CMOS integrated circuit fabrication processes, including a 0.35 μm process or a 0.18 μm process. In one embodiment, implemented using a 0.35 μm process, the filter is useful to perform equalization of a differential input signal indicative of data having a maximum data rate of at least 1.65 Gb/s.

In some variations on the FIG. 3 or FIG. 7 filter, the filter is an adaptive equalizer including a servo mechanism. For example, such a servo mechanism could vary the β and α parameters automatically to adapt the filter for use with cables of different length.

Another aspect of the invention is a system including a transmitter, a receiver, and a serial link between the transmitter and receiver, wherein the receiver includes any embodiment of the inventive equalizer.

It should be understood that while certain forms of the invention have been illustrated and described herein, the invention is not to be limited to the specific embodiments described and shown or the specific methods described. The claims that describe methods do not imply any specific order of steps unless explicitly described in the claim language.

The invention claimed is:

1. A controllable equalizer, comprising:
a first branch including a low pass filter and having a variable first gain, wherein the first branch is configured to produce a first signal by low-pass filtering and applying the first gain to an input signal;
a second branch including a high pass filter and having a variable second gain, wherein the first gain and the second gain are independently controllable, the second branch is configured to produce a second signal by high-pass filtering and applying the second gain to the input signal; and
at least one current sharing node from which current flows into both the first branch and the second branch during operation of the equalizer, and
at least one output node at which the equalizer asserts an equalized signal in response to the input signal, wherein the equalized signal is determined by the sum of the first signal and the second signal, wherein the equalizer has a transfer function having a zero whose location can be controlled by varying one of the first gain and the second gain relative to the other of said first gain and said second gain, and wherein the transfer function has a peak-to-DC gain difference that can be controlled by varying one of the first gain and the second gain relative to the other of said first gain and said second gain.

2. A controllable equalizer, comprising:
a first branch including a low pass filter and having a variable first gain, wherein the first branch is configured to produce a first signal by low-pass filtering and applying the first gain to an input signal;
a second branch including a high pass filter and having a variable second gain, wherein the first gain and the second gain are independently controllable, the second branch is configured to produce a second signal by high-pass filtering and applying the second gain to the input signal; and
at least one current sharing node from which current flows into both the first branch and the second branch during operation of the equalizer, and
at least one output node at which the equalizer asserts an equalized signal in response to the input signal, wherein the equalized signal is determined by the sum of the first signal and the second signal, wherein the equalizer has a transfer function having a zero whose location can be controlled by varying one of the first gain and the second gain relative to the other of said first gain and said second gain, the input signal is indicative of data having a maximum data rate of at least 1 Gb/s, and the equalizer is implemented using CMOS technology.

3. A controllable equalizer, comprising:
a first branch including a low pass filter and having a variable first gain, wherein the first branch is configured to produce a first signal by low-pass filtering and applying the first gain to an input signal;
a second branch including a high pass filter and having a variable second gain, wherein the first gain and the second gain are independently controllable, the second branch is configured to produce a second signal by high-pass filtering and applying the second gain to the input signal; and
at least one current sharing node from which current flows into both the first branch and the second branch during operation of the equalizer, and
at least one output node at which the equalizer asserts an equalized signal in response to the input signal, wherein the equalized signal is determined by the sum of the first signal and the second signal, wherein each of the input signal and the equalized signal is a differential signal, the first branch includes a first differential pair, the second branch includes a second differential pair, the first differential pair includes a first MOS transistor and a second MOS transistor, the second differential pair includes a third MOS transistor and a fourth MOS transistor, a gate of each of the first MOS transistor and the fourth MOS transistor is coupled to receive a first component of the input signal, a gate of each of the second MOS transistor and the third MOS transistor is coupled to receive a second component of the input signal, current flows from a first current sharing node through the first MOS transistor and the fourth MOS transistor during operation of the equalizer, and current flows from a second current sharing node through the second MOS transistor and the third MOS transistor during operation of the equalizer.

4. The equalizer of claim 3, wherein the first differential pair includes a first controllable current source coupled to sink a variable first tail current that determines the first gain, and the second differential pair includes a second controllable current source coupled to sink a variable second tail current that determines the second gain.

5. A controllable equalizer configured to equalize an input signal to produce an equalized signal, wherein each of the input signal and the equalized signal is a differential signal, said equalizer comprising:
a first differential pair, including a first MOS transistor, a second MOS transistor, and a first controllable current source coupled to sink a variable first tail current;
a second differential pair, including a third MOS transistor, a fourth MOS transistor, and a second controllable current source coupled to sink a variable second tail current, wherein a gate of each of the first MOS transistor and the fourth MOS transistor is coupled to receive a first component of the input signal, and a gate of each of the second MOS transistor and the third MOS transistor is coupled to receive a second component of the input signal; and
at least one output node at which the equalizer asserts the equalized signal in response to the input signal, and
wherein the first differential pair and the second differential pair are coupled and configured so that, during operation of the equalizer, a first current flows through the first MOS transistor, a second current flows through the second MOS transistor, a third current flows through the third MOS transistor, and a fourth current flows through the fourth MOS transistor, the first tail current is the sum of the first current and the second current, and the second tail current is the sum of the third current and the fourth current.

6. The equalizer of claim 5, wherein the equalizer has a transfer function having a zero whose location can be controlled by controlling one or both of the first controllable current source and the second controllable current source to vary one of the first tail current and the second tail current relative to the other of the first tail current and the second tail current.

7. The equalizer of claim 6, wherein the transfer function has a peak-to-DC gain difference that can be controlled by controlling one or both of the first controllable current source and the second controllable current source to vary one of the first tail current and the second tail current relative to the other of the first tail current and the second tail current.

8. The equalizer of claim 5, wherein the equalizer is implemented using CMOS technology.

9. The equalizer of claim 5, wherein the input signal is indicative of data having a maximum data rate of at least 1 Gb/s, and the equalizer is implemented using CMOS technology.

10. A receiver, including:
an equalizer, coupled and configured to receive an input signal that has propagated to the receiver over a link and to generate an equalized signal by equalizing the input signal, wherein the equalized signal is indicative of data; and
additional circuitry coupled and configured to recover the data from the equalized signal,
wherein the equalizer comprises:
a first branch including a low pass filter and having a variable first gain, wherein the first branch is configured to produce a first signal by low-pass filtering and applying the first gain to the input signal;
a second branch including a high pass filter and having a variable second gain, wherein the first gain and the second gain are independently controllable, the second branch is configured to produce a second signal by high-pass filtering and applying the second gain to the input signal; and
at least one current sharing node from which current flows into both the first branch and the second branch during operation of the equalizer, and
at least one output node, coupled to the additional circuitry, at which the equalizer asserts the equalized signal in response to the input signal, wherein the equalized signal is determined by the sum of the first signal and the second signal, wherein the equalizer has a transfer function having a zero whose location can be controlled by varying one of the first gain and the second gain relative to the other of said first gain and said second gain, and wherein the transfer function has a peak-to-DC gain difference that can be controlled by varying one of the first gain and the second gain relative to the other of said first gain and said second gain.

11. A receiver, including:
an equalizer, coupled and configured to receive an input signal that has propagated to the receiver over a link and to generate an equalized signal by equalizing the input signal, wherein the equalized signal is indicative of data; and
additional circuitry coupled and configured to recover the data from the equalized signal,
wherein the equalizer comprises:
a first branch including a low pass filter and having a variable first gain, wherein the first branch is configured to produce a first signal by low-pass filtering and applying the first gain to the input signal;
a second branch including a high pass filter and having a variable second gain, wherein the first gain and the second gain are independently controllable, the second branch is configured to produce a second signal by high-pass filtering and applying the second gain to the input signal; and
at least one current sharing node from which current flows into both the first branch and the second branch during operation of the equalizer, and
at least one output node, coupled to the additional circuitry, at which the equalizer asserts the equalized signal in response to the input signal, wherein the equalized signal is determined by the sum of the first signal and the second signal, wherein the equalizer has a transfer function having a zero whose location can be controlled by varying one of the first gain and the second gain relative to the other of said first gain and said second gain, the input signal is indicative of data having a maximum data rate of at least 1 Gb/s, and the equalizer is implemented using CMOS technology.

12. A system, including;
a serial link;
a transmitter coupled to the serial link; and
a receiver, coupled to the serial link to receive an input signal that has propagated over the serial link from the transmitter, wherein the receiver includes:
an equalizer, coupled and configured to generate an equalized signal by equalizing the input signal, wherein the equalized signal is indicative of data; and
additional circuitry coupled and configured to recover the data from the equalized signal,
wherein the equalizer comprises:
a first branch including a low pass filter and having a variable first gain, wherein the first branch is configured to produce a first signal by low-pass filtering and applying the first gain to the input signal;
a second branch including a high pass filter and having a variable second gain, wherein the first gain and the second gain are independently controllable, the second branch is configured to produce a second signal by high-pass filtering and applying the second gain to the input signal; and
at least one current sharing node from which current flows into both the first branch and the second branch during operation of the equalizer, and
at least one output node, coupled to the additional circuitry, at which the equalizer asserts the equalized signal in response to the input signal, wherein the equalized signal is determined by the sum of the first signal and the second signal, wherein the equalizer has a transfer function having a zero whose location can be controlled by varying one of the first gain and the second gain relative to the other of said first gain and said second gain, the input signal is indicative of data having a maximum data rate of at least 1 Gb/s, and the equalizer is implemented using CMOS technology.

13. A receiver including:
an equalizer, coupled and configured to receive an input signal that has propagated to the receiver over a link and to generate an equalized signal by equalizing the input signal, wherein each of the input signal and the equalized signal is a differential signal, and the equalized signal is indicative of data; and
additional circuitry coupled and configured to recover the data from the equalized signal,
wherein the equalizer comprises:
a first differential pair, including a first MOS transistor, a second MOS transistor, and a first controllable current source coupled to sink a variable first tail current;
a second differential pair, including a third MOS transistor, a fourth MOS transistor, and a second controllable current source coupled to sink a variable second tail current, wherein a gate of each of the first MOS transistor and the fourth MOS transistor is coupled to receive a first component of the input signal, and a gate of each of the second MOS transistor and the third MOS transistor is coupled to receive a second component of the input signal; and
at least one output node at which the equalizer asserts the equalized signal in response to the input signal, and
wherein the first differential pair and the second differential pair are coupled and configured so that, during operation of the equalizer, a first current flows through the first MOS transistor, a second current flows through the second MOS transistor, a third current flows through the third MOS transistor, and a fourth current flows through the fourth MOS transistor, the first tail current is the sum of the first current and the second current, and the second tail current is the sum of the third current and the fourth current.

14. The receiver of claim 13, wherein the equalizer has a transfer function having a zero whose location can be controlled by controlling one or both of the first controllable current source and the second controllable current source to vary one of the first tail current and the second tail current relative to the other of the first tail current and the second tail current.

15. The receiver of claim 14, wherein the transfer function has a peak-to-DC gain difference that can be controlled by controlling one or both of the first controllable current source and the second controllable current source to vary one of the first tail current and the second tail current relative to the other of the first tail current and the second tail current.

16. The receiver of claim 13, wherein the equalizer is implemented using CMOS technology.

17. The equalizer of claim 13, wherein the input signal is indicative of data having a maximum data rate of at least 1 Gb/s, and the equalizer is implemented using CMOS technology.

18. A system, including:
a serial link;
a transmitter coupled to the serial link; and
a receiver, coupled to the serial link to receive an input signal that has propagated over the serial link from the transmitter, wherein the receiver includes:
an equalizer, coupled and configured to generate an equalized signal by equalizing the input signal, wherein each of the input signal and the equalized signal is a differential signal, and the equalized signal is indicative of data; and
additional circuitry coupled and configured to recover the data from the equalized signal,
wherein the equalizer comprises:
a first differential pair, including a first MOS transistor, a second MOS transistor, and a first controllable current source coupled to sink a variable first tail current;
a second differential pair, including a third MOS transistor, a fourth MOS transistor, and a second controllable current source coupled to sink a variable second tail current, wherein a gate of each of the first MOS transistor and the fourth MOS transistor is coupled to receive a first component of the input signal, and a gate of each of the second MOS transistor and the third MOS transistor is coupled to receive a second component of the input signal; and
at least one output node at which the equalizer asserts the equalized signal in response to the input signal, and
wherein the first differential pair and the second differential pair are coupled and configured so that, during operation of the equalizer, a first current flows through the first MOS transistor, a second current flows through the second MOS transistor, a third current flows through the third MOS transistor, and a fourth current flows through the fourth MOS transistor, the first tail current is the sum of the first current and the second current, and the second tail current is the sum of the third current and the fourth current, wherein the input signal is indicative of data having a maximum data rate of at least 1 Gb/s, and the equalizer is implemented using CMOS technology.

* * * * *